March 15, 1955

J. A. NEAVES 2,704,177

ROLL PANNING MACHINE

Filed Feb. 17, 1950

Inventor:
Jack A. Neaves,
By Harry B. Rook,
Attorney.

March 15, 1955 J. A. NEAVES 2,704,177

ROLL PANNING MACHINE

Filed Feb. 17, 1950 3 Sheets-Sheet 2

Inventor:
Jack A. Neaves,
By: Harry B. Cook,
Attorney.

March 15, 1955 J. A. NEAVES 2,704,177

ROLL PANNING MACHINE

Filed Feb. 17, 1950 3 Sheets-Sheet 3

Inventor:
Jack A. Neaves.
BY
Harry Aylook,
Attorney.

United States Patent Office 2,704,177

Patented Mar. 15, 1955

1

2,704,177

ROLL PANNING MACHINE

Jack A. Neaves, Irvington, N. J., assignor to Thompson Machine Company, Belleville, N. J., a corporation of New Jersey Application February 17, 1950, Serial No. 144,647

6 Claims. (Cl. 226—14)

This invention relates in general to the panning of dough rolls as distinguished from loaves of dough, one object of the invention being to provide a novel and improved machine for automatically depositing rolls into baking pans.

Heretofore it has been common practice to manually place the rolls in the baking pans and the training of men to pan the rolls and the panning operation itself is slow and costly. Therefore, one object of the invention is to provide a machine which shall include a conveyor for transferring rolls from a supply station to a panning station and having a cup thereon for each roll tiltably mounted on the conveyor to gravitationally discharge the rolls, and novel and improved mechanism normally holding said cups against tilting and for causing a plurality of said cups to tilt simultaneously to deposit into a pan in rapid succession groups of rolls each including for example six rolls, all automatically and rapidly.

Still another object is to provide in such a machine simple and inexpensive means for feeding rolls to said cups, holding the cups in roll-supporting position while moving the cups into roll-depositing relation to the baking pan, and then causing automatic actuation of said cups to drop the rolls by gravity onto the baking pan.

It is another object of the invention to provide means comprising a conveyor and novel and improved stop mechanism therefor for moving the baking pans in proper timed relation to the roll cup conveyor to insure deposit of the rolls in the pan in the proper spaced relation to each other.

Other objects are to provide means for preventing the feeding of "double rolls," that is one roll stuck to another, into a roll cup; and to obtain other advantages and results that will be brought out by the following description in conjunction with the accompanying drawings in which Figure 1 is a top plan view of a roll panning machine embodying the invention;

Figures 1, 4, 9:
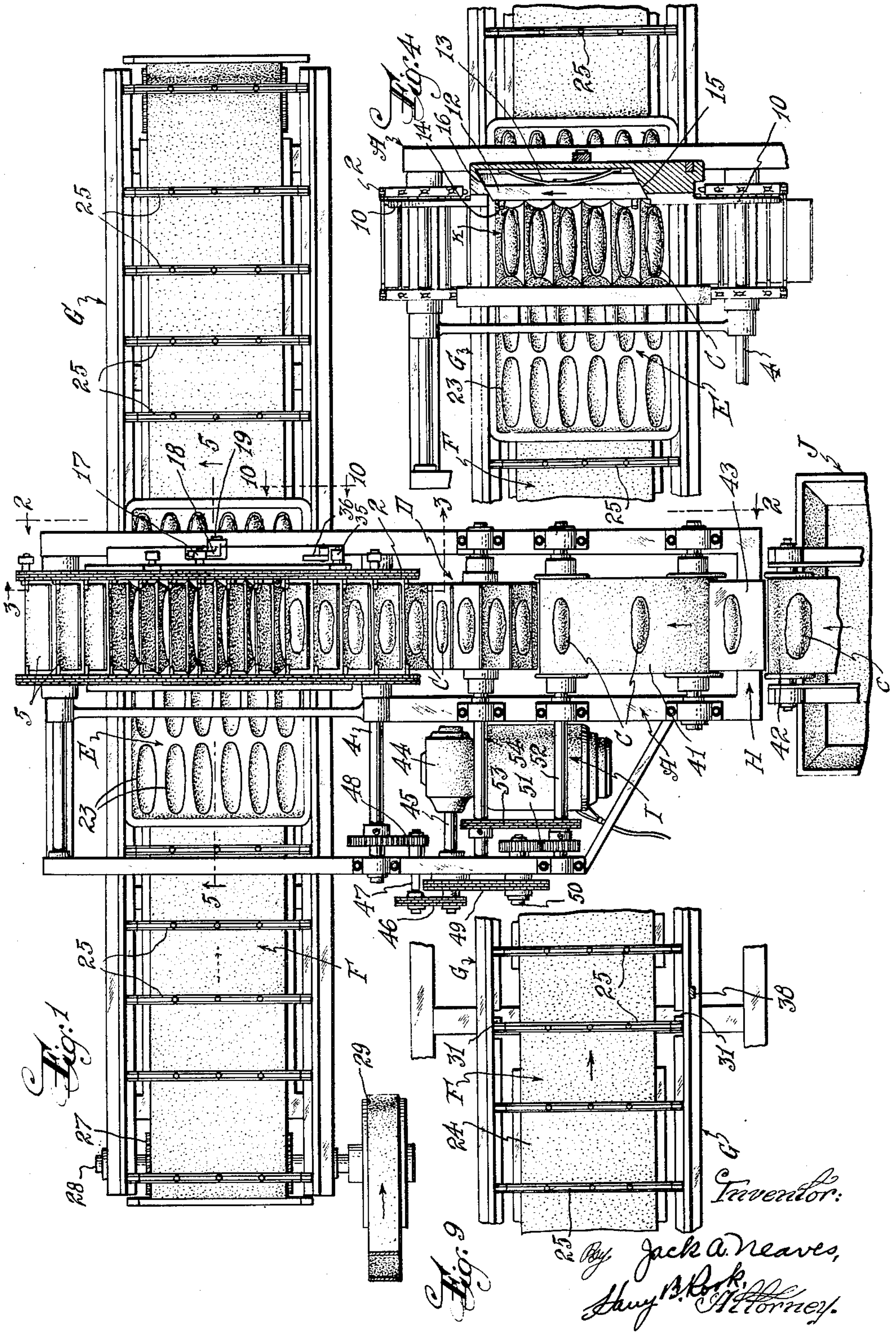
Figure 4 is a fragmentary plan view approximately on the plane of the line 4—4 of Figure 2 with portions omitted for clearness in illustration.
Figure 9 is a fragmentary top plan view of a portion of the conveyor for the baking pans.

Specifically describing the machine, the reference character A generally designates the main frame which has

Figures 2, 3, 10, 11:
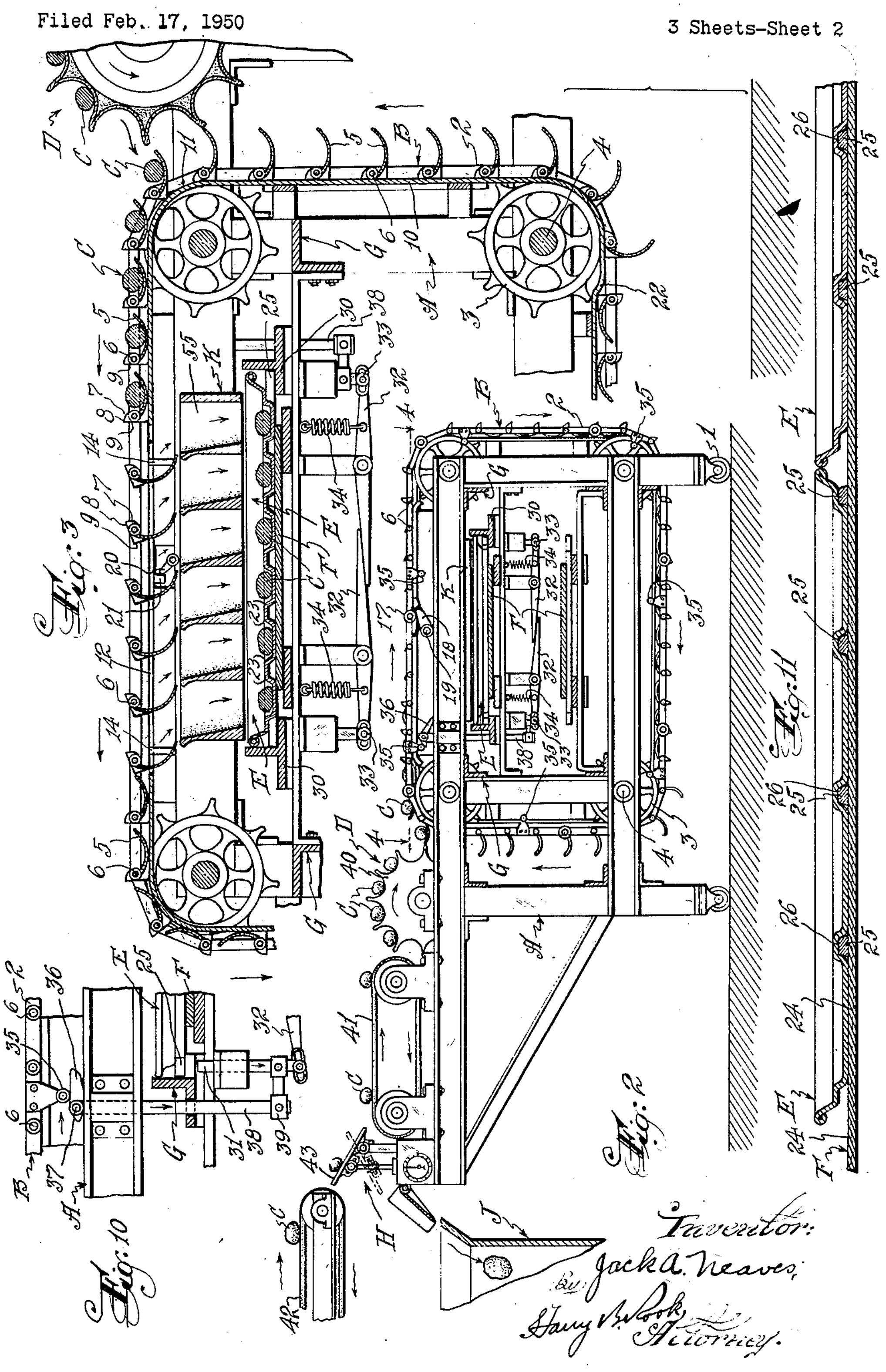
Figure 2 is a sectional side elevational view approximately on the plane of the line 2—2 of Figure 1.
Figure 3 is an enlarged fragmentary vertical sectional view approximately on the plane of the line 3—3 of Figure 1.
Figure 10 is an enlarged fragmentary sectional elevational view approximately on the plane of the line 10—10 of Figure 1 with portions broken away.
Figure 11 is a greatly enlarged fragmentary vertical sectional view through the pan conveyor with baking pans thereon.
Figure 5:
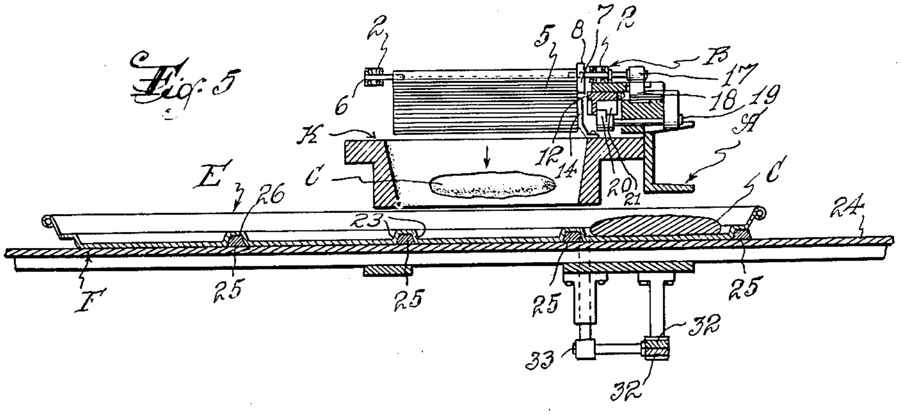
Figure 5 is a vertical sectional view approximately on the plane of the line 5—5 of Figure 1 showing the roll cups in discharging position.
Figures 6, 7, 8:
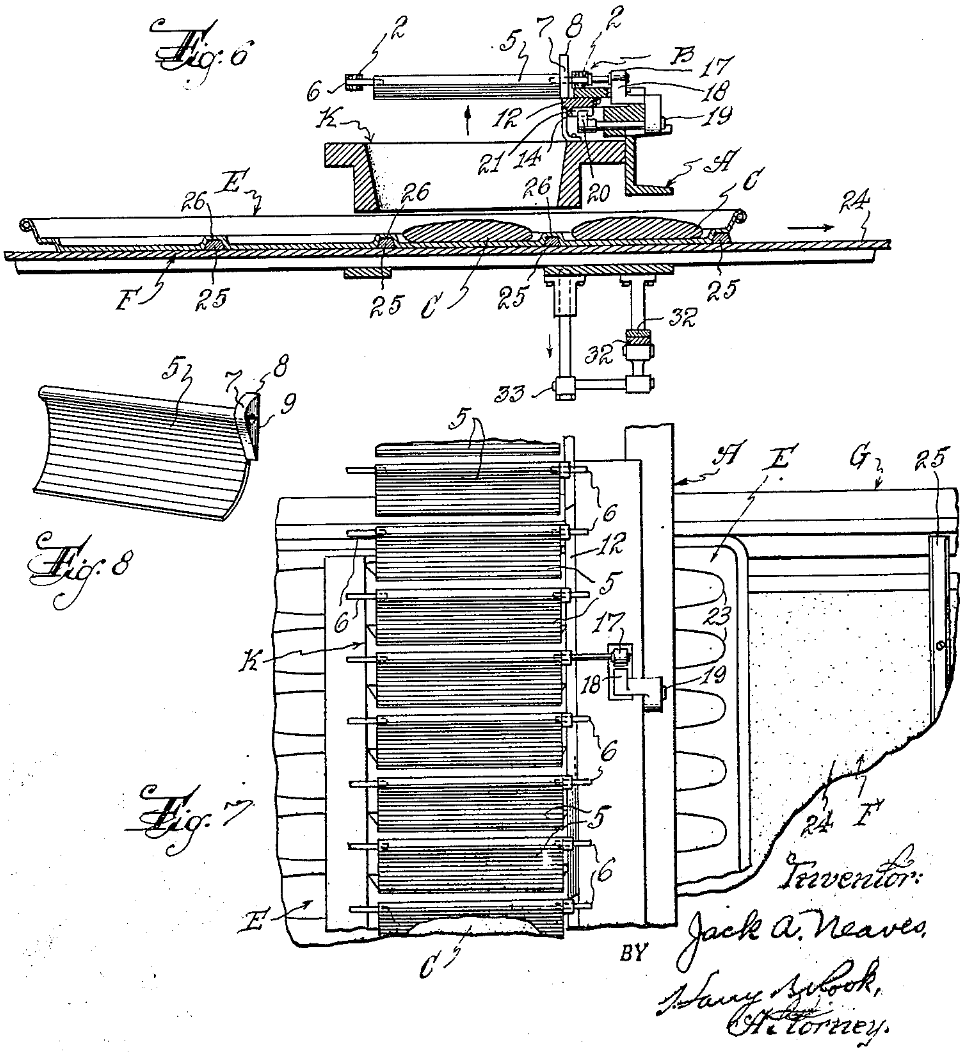
Figure 6 is a similar view with the roll cups in roll-supporting position.
Figure 7 is a top plan view of the portions of the machine shown in Figure 6 with one of the roll cup conveyor chains omitted.
Figure 8 is a fragmentary perspective view of one of the roll cups.

2 legs and may or may not be mounted on casters 1 as preferred. Mounted on the frame is a roll cup conveyor B which comprises two parallel endless chains 2 that are carried by four sprockets 3 which in turn are mounted on shafts 4 journaled in the side pieces of the frame, the conveyor thus having two vertically spaced horizontal reaches and two horizontally spaced vertical reaches as best shown in Figure 2. Mounted on and between the two chains 2 are a plurality of cups 5 for receiving dough rolls C from a feeding mechanism generally designated D and conveying the dough rolls to a discharging station where the cups are actuated to drop the rolls by gravity upon a baking pan generally designated E. The cups may be mounted on the conveyor in any suitable way, but as shown are spaced equidistantly from each other lengthwise of the chains and pivotally connected to the chains by pivot pins 6 so as to swing about parallel axes that are perpendicular to the direction of movement of the conveyor; and each cup has at least at one end thereof a lug 7 provided with two right angularly disposed and meeting surfaces 8 and 9 to cooperate with a track 10 for maintaining the cups in proper relation to the conveyor chains for receiving and supporting the rolls. As shown, the lug surfaces 8 frictionally slide along the right hand vertical portion of the track 10 adjacent the roll feeding mechanism D so as to hold the cups 5 approximately perpendicular to the corresponding reach of the chain but in horizontal position to receive a roll from the feeding mechanism at the upper end of said conveyor reach as best shown in Figure 3. The track 10 has an arcuately curved portion 11 at the juncture of said vertical reach 10 and the uppermost horizontal reach of the cup conveyor, and as the cups pass over this curved portion, they are held in horizontal position by the engagement of the lugs 7 with said curved portion until the cups move onto the horizontal reach of the conveyor, whereupon the lug surfaces 9 engage the track 10 and continue to hold the cups in horizontal position to properly support the rolls C.

Along the upper horizontal reach of the cup conveyor certain of the cups are permitted to swing downwardly by gravity to drop the rolls therefrom, and as shown the track 10 has a movable section 12 which is normally disposed to be engaged by the cup lugs 7 but is horizontally slidable from beneath said cup lugs to release the cups. As best shown in Figure 4, the movable section 12 is actuated outwardly into its normal position by a spring 13 into engagement with stops 14 mounted on the frame A, and for actuating the movable or trip section horizontally from beneath the cup lugs, the ends of said trip section are beveled as indicated at 15 and engage correspondingly beveled surfaces 16 on a portion of the frame, so that upon application of pressure on the trip section tending to move it longitudinally, the trip section will also slide horizontally and laterally against the influence of the spring 13.

For actuating the trip section 12 horizontally and longitudinally, rollers 17 are mounted on one of the conveyor chains 2 and cooperate with a lever 18 pivotally mounted on the frame as indicated at 19 and having a finger 20 cooperating with the lug 21 on the underside of the trip section so that at the proper time the roller 17 will press downwardly on the lever 18 and cause the finger 20 to push the trip section longitudinally in the direction of the arrow shown in Figure 4. Upon disengagement of the rollers 17 from the lever 18, the spring 13 will move the trip section 12 back to its normal position.

The trip section 12 is of a length corresponding to a certain number of adjacent cups on the conveyor, for example six cups as shown, and the rollers 17 are located on the conveyor chain in proper relation to successive groups of the cups, so that the trip section 12 will be operated in proper timed relation to the movement of the conveyor so as to simultaneously release the groups in succession.

After the groups have deposited the rolls into the baking pan, the surfaces 9 of the cup lug surfaces 8 again engage the track so as to positively hold the cups against pivotal movement until they arrive at the lower end of the vertical reach adjacent the feeding mechanism D, whereupon the lug surfaces 8 engage an angular portion 22 on the track which causes the cups to be swung outwardly to bring the lug surfaces 8 into engagement with the track and thereby hold the cups in proper relation to receive the rolls from the feeding mechanism D.

The pans E are shown as formed of thin sheet metal and as having four transverse rows of depressions or pockets 23 spaced longitudinally of the pans, each row including six pockets each of which is of a shape and size to receive one roll, and in accordance with the invention the pans are moved intermittently or step by step in timed relation to the release of the groups of roll cups so that one row of pockets 23 will be disposed beneath each group of cups when the latter are released. As shown on the drawings, the pans are fed by an endless belt conveyor mechanism F which includes a belt 24 movable in a direction at right angles to the direction of movement of the chains 2 and upon which are fixedly secured a plurality of transverse cleats 25 which engage shoulders 26 in the bottom surfaces of the baking pan at the ends of the roll pockets 23, so that when the pans are set on the belt, the cleats 25 will hold the pans against longitudinal movement relatively to the belt. As shown, the cleats 25 are also arranged in groups, there being four cleats in each group equidistantly spaced apart for each pan, but the juxtaposed cleats of next adjacent groups are spaced apart farther than the cleats of the respective groups as best shown in Figure 11, so that the pans can be arranged in end to end substantially contacting relation, the wider spacing between the cleat groups compensating for the flanges on the pans. Obviously other forms of pans and other arrangements of cleats are possible.

The belt 24 is mounted on pulleys 27 which are carried by shafts 28 journaled in an auxiliary frame G, and one of the shafts is continuously driven through a belt and pulley 29 from any suitable source of power. For supporting the upper reach of the belt on which the baking pans are mounted, the ends of the cleats 25 project beyond the side edges of the belt and slidably engage track flanges 30 on the auxiliary frame, and means is also provided on the frame for periodically interrupting the movement of the conveyor belt so as to properly locate the roll pockets of the pans to receive the rolls discharged from the roll cups 5. This means is shown as comprising two stop rods 31 that are slidably mounted in the side pieces of the auxiliary frame G so as to be projectable into and retractable out of the path of movement of the cleats 25. Normally these stop rods are projected through levers 32 with which the stop rods have pin and slot connections 33 and which are normally actuated by springs 34 to push the stop rods upwardly so that they will be engaged by a cleat as shown in Figure 9. It will be observed that the levers 32 are pivotally mounted intermediate their ends and that the ends thereof opposite the pin and slot connection 33 overlappingly engage each other so that the two levers operate simultaneously, in timed relation to the release of the roll cups. The stop rods 31 are retracted by rollers 35 carried by one of the conveyor chains 2 and cooperating with a block 36 that is pivotally connected intermediate its ends at 37 to a push rod 38 which is in turn connected to one of the stop rods through an arm 39 (see Figure 10). The block 36 normally is disposed in the path of movement of the rollers 35 so that each roller 35 will engage the block and press it downwardly so as to retract the stop rods, and the block at the side of the pivot 37 in the direction of the movement of the conveyor chain 2 is of sufficient length to provide a dwell, in other words, to hold the stop rod out of the path of the cleats 25 a sufficient time to permit the belt 24 to move a baking pan a distance sufficient to remove a deposited row of rolls from beneath the roll cups and to move the next row of roll pockets 23 into position to receive the rolls to be discharged from the next group of roll cups; and upon disengagement of the roller 35 from the block 36, the springs 34 will project the stop rods 31 so that they will be engaged by the approaching cleats 25 and thereby stop the conveyor belt, and at the same time the push rod 38 will be elevated to raise the block 36 into the path of the next approaching roller 35 as shown in Figure 2.

There may be slippage between the parts for applying power to the conveyor, for example between the belt and the pulley of the drive 29, when the belt is stopped by the stop members 31.

Now turning to the roll feed mechanism D, it comprises a roll spacing wheel 40 having a plurality of recesses in its periphery to receive the rolls from a transfer conveyor 41 which transfers the rolls from a double roll ejector mechanism H to the wheel 40. The rolls are supplied to the panning machine by a feed conveyor 42.

With this construction, it will be observed that the rolls will be dropped by gravity from the feed conveyor 42 upon the tray 43 of the double roll ejector H and if a "double roll," that is two rolls stuck together, land on the tray 43, the tray will be tilted into the dotted line position shown in Figure 2 so as to discard the double roll into a hopper J. The single rolls will fall by gravity from the tray 43 onto the transfer conveyor 41 and thence drop by gravity into the corresponding recesses of the spacing wheel 40, from which the rolls will be dropped by gravity onto the roll cups 5 of the panning conveyor B.

Manifestly the parts must be driven in proper timed relation to each other, and as shown the driving mechanism includes an electric motor I mounted on the main frame A and connected through a speed reducing gear 44 to a power output shaft 45 which through a chain and sprocket gearing 46 drives a counter shaft 47 which has a spur gear connection 48 with one of the sprocket shafts 4 of the panning conveyor. The output shaft 45 also has a chain and sprocket connection 49 with a stud shaft 50 which through spur gearing 51 is connected to the shaft 52 of the transfer conveyor 41. The shaft 52 in turn has a chain and sprocket connection 53 with the shaft 54 of the spacing wheel 40.

It will be understood by those skilled in the art that the number of roll cups 5 on the panning conveyor will be a multiple of the number of cups in each group of cups, in the present case a multiple of six, and that also the number of recesses in the spacing wheel 40 and the speed of rotation of said wheel must be properly correlated with the speed of the panning conveyor.

It will also be understood that the pan conveyor belt will be operated in such timed relation to the panning conveyor that the rows of roll pockets 23 in the pans will be brought successively into proper position beneath the upper reach of the panning conveyor to receive the rolls discharged from the roll cups, and that when each filled pan reaches the end of the conveyor G, the pan will be removed from the conveyor and transported to the desired location preparatory to the baking operation.

Depending upon the distance between the upper reach of the panning conveyor and the baking pans, means may be required to guide the rolls from the roller cups to the roll pockets in the pan. For the purpose of illustration, I have shown a guide element K on the main frame having a passage 55 to receive the roll that is discharged from each of the roll cups and to guide that roll to the proper roll pocket 23, as best illustrated in Figures 3 and 4.

While I have shown and described the invention as embodying certain details of construction, it should be understood that this is done primarily for the purpose of illustrating the principles of the invention and that the construction of the machine may be widely modified within the spirit and scope of the invention.

I claim:

1. In a roll panning machine, the combination of a frame, means thereon for conveying rolls from a supply station to a panning station and automatically successively discharging groups of said rolls at said panning station, and means for conveying pans to said panning station in timed relation to the discharge of said groups of rolls to receive the rolls as they are discharged, the first-mentioned means comprising an endless conveyor having a tiltably mounted cup thereon for each roll in a group tiltable about an axis perpendicular to the direction of travel of said conveyor to gravitationally discharge the roll, said cups being spaced apart longitudinally of the conveyor and mechanism normally holding said cups against tilting and for causing a plurality of said cups to tilt simultaneously including a track along which moves a portion of each cup for holding the cup against tilting, said track having a movably mounted trip section movable out of engagement with all cups of a group simultaneously to provide for tilting of said cups for discharging the rolls therefrom.

2. In a roll panning machine, the combination of a frame, means thereon for conveying rolls from a supply station to a panning station and automatically successively discharging groups of said rolls at said panning station, and means for conveying pans to said panning station in timed relation to the discharge of said groups of rolls to receive the rolls as they are discharged, the first-mentioned means comprising an endless conveyor having a tiltably mounted cup thereon for each roll in a group tiltable to gravitationally discharge the roll, and mechanism normally holding said cups against tilting and for causing a plurality of said cups to tilt simultaneously, including a track along which moves a portion of each cup for holding the cup against tilting, said track having a trip section movable out of engagement with all cups of a group simultaneously to provide for tilting of said cups to discharge the rolls therefrom, and means including an element on said conveyor for moving said trip section out of engagement with said cups.

3. A roll panning machine comprising means for conveying rolls from a supply station to a panning station, said means having a frame and a pair of parallel endless chains and sprockets supporting them on said frame, a plurality of roll cups mounted in equidistantly spaced relation along and between said chains and constructed to discharge rolls therefrom by gravitational action, mechanism including cooperative elements on said frame and at least on one of said chains for controlling actuation of a predetermined number of said cups simultaneously at said panning station to discharge the rolls therefrom, and means for conveying pans to said panning station in timed relation to the discharge of said rolls, said panning station being located intermediate the ends of one reach of said endless chains, said cups being tiltably mounted on said chains, said mechanism including a track along which moves a portion of each cup for holding the cup against tilting, one of said elements constituting a movably mounted section of said track movable out of engagement with said portions of said certain number of cups to cause tilting of said cups to discharge the rolls, and the other of said elements controlling movement of said track section.

4. In a roll panning machine, the combination of a frame, means thereon for conveying rolls from a supply station to a panning station and automatically successively discharging groups of said rolls at said panning station, and means for conveying pans to said panning station in timed relation to the discharge of said groups of rolls to receive the rolls as they are discharged, including an auxiliary frame, an endless conveyor belt on said auxiliary frame, and mechanism for driving said belt step-by-step including a pair of pulleys on which said belt is mounted, elements spaced longitudinally along and projecting from at least one edge of said belt, stop members on said auxiliary frame projectable and retractable into and out of the path of movement of said elements to stop and release said belt respectively, means on the first-mentioned means for controlling actuation of said stop members, and means applying power to one of said pulleys for driving said belt and including a plurality of parts having a frictional driving connection between them to permit relative slippage of said parts when said belt is stopped by said stop members.

5. In a roll panning machine, the combination of a frame, means thereon for conveying rolls from a supply station to a panning station and automatically successively discharging groups of said rolls at said panning station, and means for conveying pans to said panning station in timed relation to the discharge of said groups of rolls to receive the rolls as they are discharged, the first-mentioned means comprising an endless conveyor having a tiltably mounted cup thereon for each roll in a group tiltable about an axis perpendicular to the direction of travel of the conveyor to gravitationally discharge the roll, said cups being spaced apart longitudinally of the conveyor and mechanism normally holding said cups against tilting and for causing a plurality of said cups to tilt simultaneously, including a movably mounted element on said frame at said panning station engaged by a portion of each of said plurality of cups as the cup moves into said panning station for holding the cups against tilting, and means for disengaging said element simultaneously from said portions of all of said plurality of cups when all of them are located at said panning station.

6. In a roll panning machine, the combination of a frame, means thereon for conveying rolls from a supply station to a panning station and automatically successively discharging groups of said rolls at said panning station, and means for conveying pans to said panning station in timed relation to the discharge of said groups of rolls to receive the rolls as they are discharged, the first-mentioned means comprising an endless conveyor having a tiltably mounted cup thereon for each roll in a group tiltable about an axis perpendicular to the direction of travel of said conveyor to gravitationally discharge the roll, said cups being spaced apart in the direction of movement of said conveyor, and means for holding said cups normally against tilting while they are moved from the supply station into said panning station including a movably mounted element at said panning station common to all of a plurality of cups at the panning station, and means causing movement of said element for releasing all of said plurality of cups simultaneously for tilting.

References Cited in the file of this patent

UNITED STATES PATENTS

| | | |
|---|---|---|
| 1,679,402 | Brown | Aug. 7, 1928 |
| 2,049,538 | Friend | Aug. 4, 1936 |
| 2,067,301 | Miller, Sr. | Jan. 12, 1937 |
| 2,119,767 | Anderson | June 7, 1938 |
| 2,437,950 | Gaddini | Mar. 16, 1948 |
| 2,536,249 | Archer | Jan. 2, 1951 |